United States Patent [19]

Nogi et al.

[11] Patent Number: 4,680,663
[45] Date of Patent: Jul. 14, 1987

[54] POWER SUPPLY INSTALLATION FOR DC ELECTRIC RAILROAD

[75] Inventors: Teiji Nogi, Tokyo; Toyomi Gondo, Fujisawa, both of Japan

[73] Assignee: Kabushiki Kaisha Meidensha, Tokyo, Japan

[21] Appl. No.: 874,505

[22] Filed: Jun. 16, 1986

[30] Foreign Application Priority Data

Jun. 17, 1985 [JP] Japan ................. 60-131466

[51] Int. Cl.$^4$ .............................................. H02M 7/00
[52] U.S. Cl. .......................................... 361/2; 361/67; 307/29; 307/38; 104/289
[58] Field of Search ............. 361/2, 62, 67; 363/54, 363/128; 307/12, 29, 38, 85, 145, 138, 317 R, 321; 104/289, 298; 246/187 R, 34 C, 121; 318/762

[56] References Cited

U.S. PATENT DOCUMENTS

| 3,872,363 | 3/1975 | Gross | 318/762 |
| 3,940,680 | 2/1976 | Tadokora et al. | 104/289 |
| 4,185,561 | 1/1980 | Reymann | 307/138 X |

Primary Examiner—A. D. Pellinen
Assistant Examiner—Todd DeBoer
Attorney, Agent, or Firm—Bachman & LaPointe

[57] ABSTRACT

Four sets of a first pair of diodes, a second pair of diodes and a GTO breaker are connected between the power rectifier, the power inverter and four electric car power supply lines arranged in parallel with each other and separated by two dead sections. Therefore, it is possible to cut off powering current and regenerative current simultaneously by simply turning off the GTO breaker. Further, even if a regenerative electric car is running on the electric car power supply lines, it is possible to prevent the occurrence of an arc at the other dead sections due to a potential difference between two power supply lines. Further, in case of powering/regenerative bus bar accident, it is possible to effectively cut off both a regenerative current and an extension power supply current flowing from the power supply lines by the four GTO breakers of a relatively small interrupt capability without exerting the influence of power suspension upon other adjacent substations supplying the extension power supply current.

5 Claims, 2 Drawing Figures

POWER SUPPLY INSTALLATION FOR DC ELECTRIC RAILROAD

BACKGROUND OF THE INVENTION

1. Field of the Invention

The present invention relates generally to a power supply installation for a direct current (dc) electric railroad and more specifically to a power supply installation by which an alternating current (ac) power is converted into a dc power before being supplied to electric cars as a powering source.

2. Description of the Prior Art

Usually, a plurality of dc substantions are installed at appropriate intervals along a railroad track. In these dc substations, a single or plural sets of converters are arranged. The dc power output side of the converter is connected to each of electric car power supply lines through each semiconductor breaker and the ac power input side thereof is directly connected in common with a powering bus bar. In other words, plural power supply circuits having power rectifiers and high-speed dc breakers are connected in parallel with each other between substations so as to constract a dc power supply installation.

On the other hand, the electric car power supply lines are divided into plural sections, and each of the above divided electric car power supply line is connected to a positive bus bar through a high-speed breaker provided for each electric car power supply line and the electric car rails are connected to a negative bus bar at each substation.

In the prior art power supply installation for a dc railroad using semiconductor breakers, however, there exist various drawbacks as follows: (1) When the dc disconnecting switch is required to be opened, a powering breaker and a regenerative breaker should both be opened. Under these conditions, since a potential difference will be generated at a dead section whenever an electric car passes over the dead section, an arc is inevitably generated at the dead section, so that an accident may occur. (2) In addition, when the regenerative breaker is open, if a regenerative electric car is running on the electric car power supply line, a potential difference will occur at the other dead sections not directly related to the dc disconnecting switch now being opened. (3) In case of a powering/regenerative bus bar accident, the power rectifier and the regenerative breaker should both be opened. Under these conditions, if the extension power supply current supplied from the adjacent substation is required to be interrupted by the regenerative breaker, it is necessary to increase the interrupt capability of the regenerative breaker. Otherwise, the adjacent substation for supplying the extension power should also be suspended, thus resulting in a wide power suspension over a long car track.

The arrangement of the prior art power supply installation for a dc railroad will be described in more detail hereinafter with reference to the attached drawing under DETAILED DESCRIPTION OF THE PREFERRED EMBODIMENT.

SUMMARY OF THE INVENTION

With these problems in mind, therefore, it is the primary object of the present invention to provide a power supply installation for a dc railroad by which both the powering current and the regenerative current can be interrupted by a single semiconductor breaker without generating potential differences at the other dead sections and without increasing the interrupt capability of the regenerative breaker for interrupting both a regenerative current and an extension power supply current flowing through the electric car power supply lines.

To achieve the above mentioned object, the power supply installation for a dc railroad according to the present invention comprises (a) a power rectifier for converting an alternating current power to a direct current power in powering operation; (b) a power inverter for converting a direct current power to an alternating current power in regenerative operation; (c) a stopper diode connected between an output side of the power rectifier and an input side of the power inverter; (d) a first pair of diodes each having a cathode connected to each other, the first pair of diodes being connected between the output side of the power rectifier and the at least one electric car power supply line; (e) a second pair of diodes each having an anode connected to each other, the second pair of diodes being connected between the input side of the power inverter and the at least electric car power supply line; and (f) a breaker connected between a first common junction point of the cathodes of the first pair of diodes and a second common junction point of the anodes of the second pair of diodes, for simultaneously controlling a connection or a disconnection of a powering current supplied from the power rectifier to the electric car power supply line and a regenerative current supplied from the electric car power supply line to the power inverter.

The breaker is a gate turn-off thyristor having an anode connected to the first common junction point and a cathode connected to the second common junction point. In usual, four sets of the first pair of diodes, the second pair of diodes and the breaker are connected between the output side of the power rectifier, the input side of the power inverter and four electric car power supply lines such as a first power supply line, a second power supply line arranged in parallel with the first power supply line, a third power supply line in line with the first power supply line with a dead section intervening between the two, and a fourth power supply line in line with the second power supply line with another dead section intervening between the two.

In the power supply installation according to the present invention, since the powering current and the regenerative current both flow through the semiconductor breaker in the same direction, it is possible to cut off both the powering and regenerative currents simultaneously by turning off the breaker. Therefore, when the breaker has been opened, since the regenerative current is also cut off even if a regenerative electric car is running on the electric car power supply lines, the breakers for interrupting only regenerative currents can be eliminated, and further it is possible to safely open the disconnecting switch. Once one disconnecting switch has been opened, a potential difference will be generated at the corresponding dead section. However, since the other breakers and the other disconnecting switches are kept closed, the generative current is restored to the regenerative bus bar without generating a potential difference at the other dead sections.

Further, even in the case of powering/regenerative bus bar accident, since it is possible to effectively cut off the regenerative current and the extension power supply current supplied from the adjacent substation through the electric car power supply lines without use of a regenerative breaker with an excessively great interrupt capability, it is possible to interrupt the power of only the corresponding substation without exerting the influence of power suspension upon the other adjacent substations.

BRIEF DESCRIPTION OF THE DRAWINGS

The features and advantages of the power supply installation for a dc railroad according to the present invention over the prior art power supply installation will be more clearly appreciated from the following description of the preferred embodiment of the invention taken in conjunction with the accompanying drawings in which like reference numerals designate the same or similar elements or sections and in which.

DETAILED DESCRIPTION OF THE PREFERRED EMBODIMENT

To facilitate understanding of the present invention, a brief reference will be made to a prior art power supply installation for a dc electric railroad with reference to the attached drawing.

Figure 1:
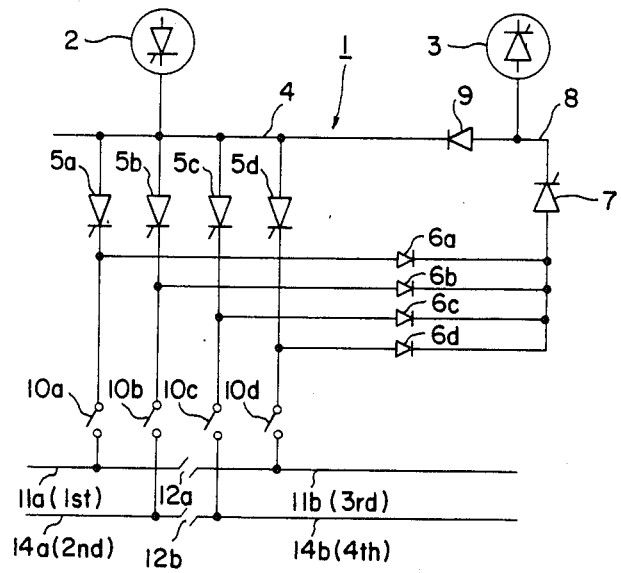
FIG. 1 is a schematic block diagram of the prior art power supply installation for a dc electric railroad.

In FIG. 1, the reference numeral 1 denotes a dc substation; the numeral 2 denotes a power rectifier made up of power thyristors for converting an ac power to a dc power; the numeral 3 denotes a power inverter also made up of power thyristors for converting a dc power to an ac power; the numeral 4 denotes a powering bus bar; the numerals 5a to 5d denote powering GTO thyristors (referred to as powering breakers); the numerals 6a to 6d denote regenerative stopper diodes. The cathodes of these diodes 6a to 6d are all connected to a regenerative bus bar 8 connected to the power inverter 3 through a regenerative thyristor circuit breaker 7 (referred to as a regenerative breaker). Further, the reference numeral 9 denotes a stopper diode connected between the powering bus bar 4 and the regenerative bus bar 8; the numerals 10a to 10d denote dc disconnecting switches; the numeral 11a and 11b denote first and third electric car power supply lines; and the numeral 14a and 14b denote second and fourth electric car power supply lines. The first and third electric car power supply lines 11a and 11b are separated from each other by a first dead section 12a and the second and fourth electric car power supply lines 14a and 14b are separated from each other by a second dead section 12b (a section through which no current flows).

In FIG. 1, in order to supply an electric car power to an electric car, a three-phase ac voltage received from a commercial frequency 3-phase ac transmission line (not shown) through an ac circuit breaker (not shown) is dropped to an appropriate voltage through a transformer arranged in the substation, converted to a dc power through the power rectifier 2, and then supplied to an electric car (not shown) through each of the first, second, third and fourth electric car power supply lines 11a, 11b and 14a, 14b.

When an electric car is in regenerative operation, the regenerative power is restored from the four electric car power supply lines 11a, 11b and 14a, 14b to the regenerative bus bar 8 through the four regenerative stopper diodes 6a to 6d and the regenerative circuit breaker 7. The regenerative power of the bus bar 8 is restored to the powering electric car on the electric car power supply lines through the stopper diode 9 or to the 3-phase ac transmission line through the power inverter 3.

The above-mentioned prior art power supply installation for a dc electric railroad involves various problems as follows:

(1) In the case only the dc disconnecting switch 10a is required to be opened for maintenance, for instance, this disconnecting switch 10a should be opened after the powering breaker 5a has been turned off for safety. Further, when an electric car in regenerative breaking operation is running on the first electric car power supply line 11a, the regenerative breaker 7 should also be turned off before opening the dc disconnecting switch 10a. As described above, in order to open the dc disconnecting switch 10a, the regenerative breaker 7 is turned off, so that a potential difference is generated at the first dead section 12a. Therefore, in case an electric car passes through the first dead section 12a when the potential difference is being generated, an electric arc will be produced at the first dead section 12a and thereby an accident may be caused.

(2) In addition to the generation of potential difference at the first dead section 12a, there exists the problem in that another potential difference will be produced at the second dead section 12b not directly related to the opened dc disconnecting switch 10a when a regenerative electric car is passing on either of the other electric car power supply lines 14a and 14b, because the regenerative breaker 7 is kept turned off.

(3) In case the powering bus line 4 or the regenerative bus line 8 is in trouble, the gates of the thyristors of the power rectifier 2 are all turned off and simultaneously the regenerative breaker 7 is also turned off. In these conditions, since the regenerative current and the extension power supply current (supplied from the adjacent substation through an electric car running on the dead section) both should be cut off by the regenerative breaker 7, the current interrupting capability of the breaker 7 becomes larger than that of the powering breaker 5a to 5d. This is because if the current interrupt capability of the regenerative breaker 7 is small, in particular, there exists another problem such that all the adjacent substations for supplying the extension power supply current should be suspended, causing all the electric cars within these adjacent substations to be tied up.

(4) The characteristics and the objects of the powering breaker and the regenerative breaker are quite different from each other. Therefore, there exists another problem in that the controlling means of the power supply installation are complicated in structure and operation in the case of the prior art installation.

In view of the above description, reference is now made to one embodiment of the power supply installation for a dc railroad according to the present invention applied to a double-track railroad, with reference to the attached drawing.

Figure 2:
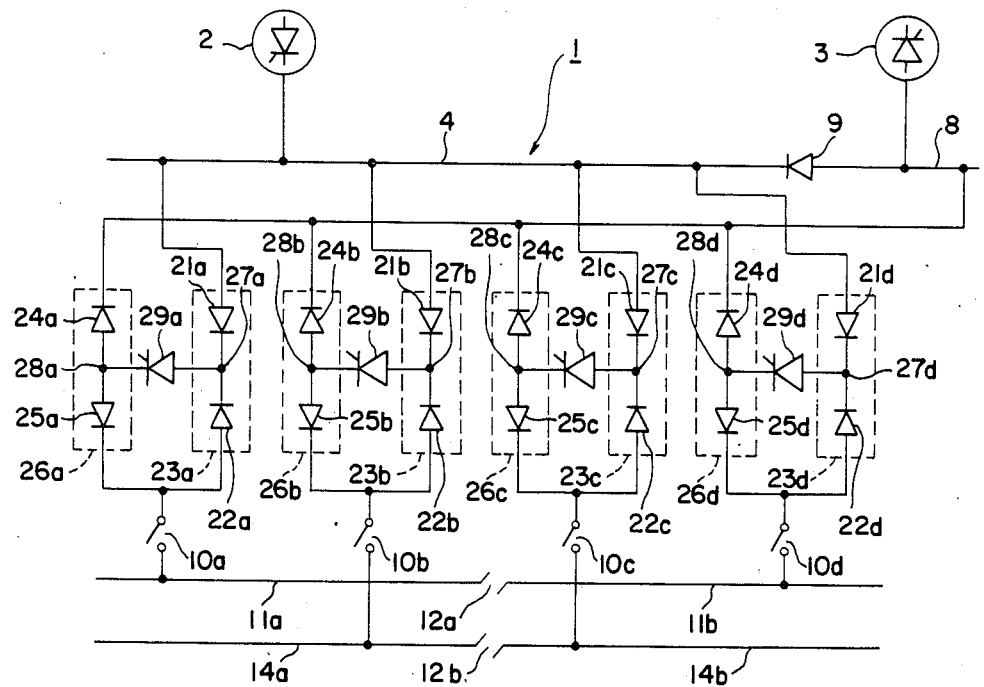
FIG. 2 is a schematic block diagram of the power supply installation for a dc electric railroad according to the present invention.

In FIG. 2, the same references have been retained for similar parts or sections which have the same functions as is the case with the prior art installation previously described with reference to FIG. 1, and any detailed description of them is believed to be unnecessary.

Being different from the prior art installation shown in FIG. 1, in FIG. 2, first four pairs of diodes 23a, 23b, 23c and 23d are connected between the powering bus bar 4 and the four dc disconnecting switches 10a, 10b, 10c and 10d. Further, second four pairs of diodes 26a, 26b, 26c and 26d are connected between the regenerative bus bar 8 and the four dc disconnecting switches 10a, 10b, 10c and 10d. Each 23a, 23b, 23c or 23d of these first four pairs of diodes is composed of two diodes 21a and 22a, or 21b and 22b or 21c and 22c or 21d and 22d, respectively, whose cathodes are connected to each other. Each 26a, 26b, 26c or 26d of the these second four pairs of diodes is composed of two diodes 24a and 25a or 24b and 25b or 24c and 25c or 24d and 25d, respectively, whose anodes are connected to each other. Further, four GTO thyristor breakers 29a, 29b, 29c and 29d are connected between the first pairs of diodes 23a, 23b, 23c or 23d and the second pairs of diodes 26a, 26b, 26c or 26d, separately. In more detail, the anode of the GTO thyristor breaker 29a is connected to a common junction point 27a of the first pair of diodes 23a and the cathode thereof is connected to a common junction point 28a of the second pair of diodes 26a. The anode of the GTO thyristor breaker 29b is connected to a common junction point 27b of the first pair of diodes 23b and the cathode thereof is connected to a common junction point 28b of the second pair of diodes 26b. The anode of the GTO thyristor breaker 29c is connected to a common junction point 27c of the first pair of diodes 23c and the cathode thereof is connected to a common junction point 28c of the second pair of diodes 26c. The anode of the GTO thyristor breaker 29d is connected to a common junction point 27d of the first pair of diodes 23d and the cathode thereof is connected to a common junction point 28d of the second pair of diodes 26d.

The operation of the power supply installation shown in FIG. 2 will be described hereinbelow.

(1) Under normal conditions:

Normally, the four GTO thyristor breakers (referred to as GTOs) 29a, 29b, 29c and 29d are kept turned on. Therefore, the powering current applied from the power rectifier 2 is supplied to the first, second, third and fourth electric car power supply lines 11a, 11b and 14a and 14b by way of the diode 21a, 21b, 21c or 21d, the GTO 29a, 29b, 29c or 29d, the diode 25a, 25b, 25c or 25d, and the dc disconnecting switch 10a, 10b, 10c or 10d.

Further, the regenerative current supplied from the first, second, third and fourth electric car power supply lines 11a, 11b, 14a or 14b is restored to the regenerative bus bar 8 by way of the dc disconnecting switch 10a, 10b, 10c or 10d, the diode 22a, 22b, 22c or 22d, GTO 29a, 29b, 29c or 29d, and the diode 24a, 24b, 24c or 24d.

As described above, since both the powering current and the regenerative current pass through each GTO 29a, 29b, 29c or 29d, it is possible to cut off both the powering and regenerative currents simultaneously by turning off only the GTOs 29a, 29b, 29c and 29d.

(2) When dc disconnecting switch 10a is required to be opened:

Once the GTO 29a is turned off, even if a regenerative electric car is running on the first electric car power supply line 11a, it is possible to cut off the regenerative current. Therefore, it is possible to open the dc disconnecting switch 10a after having turned off only the GTO 29a.

When only the dc disconnecting switch 10a is opened, although a potential difference will inevitably be produced at the first dead section 12a, since the other GTOs 29b and 29c and the other dc disconnecting switches 10b and 10c are all kept closed or on, the regenerative current generated by a regenerative electric car running on the second and fourth electric car power supply lines 14a and 14b is restored to the regenerative bus bar 8, so that no potential difference will be produced at the second dead section 12b. Therefore, it is possible to improve the reliability in car running operation.

(3) When powering and regenerative bus bars 4 and 8 are in trouble:

The output power of the power rectifier 2 is turned down and simultaneously the GTOs 29a, 29b, 29c and 29d are all turned off automatically. Therefore, it is possible to repair the defective bus bars by interrupting only the power of the corresponding substation without exerting power suspension influence upon the other adjacent substations.

In this case, both the regenerative current and the extension power supply current supplied from the adjacent substations can effectively interrupted separately by the ordinary GTO breakers 29a, 29b, 29c and 29d without use of the GTOs having an excessively great interrupt capability of high cost.

Further, the number of GTOs 29a, 29b, 29c and 29d is the same as that of the electric car power supply lines 11a, 11b, 14a and 14b and further the power supply installation is easy to control and handle in operation and maintenance.

As described above, in the power supply installation according to the present invention, since plural sets of a first pair of diodes, a second pair of diodes and a breaker are connected between the power rectifier, the power inverter and electric car lines, it is possible to simultaneously cut off both the powering current and the regenerative current by simply turning off only the breaker before opening the dc disconnecting switch for maintenance.

Therefore, when a regenerative power is being generated, even if one disconnecting switch is opened after the corresponding GTO breaker has been turned off, since the other GTO breakers and the other disconnecting switches are kept on, it is possible to effectively prevent the occurrence of an arc at the other dead sections due to a potential difference between the two power supply lines.

Further, in case of powering/regenerative bus bar accident, the breakers for regenerative currents are not required in particular and further it is possible to effectively cut off both the regenerative current and the extension power supply current flowing from the electric car lines by the four GTO breakers of a relatively small interrupt capability without suspending the adjacent substations supplying the extension power supply current.

Since the number of the breakers (GOT thyristor) is the same as that of the electric car power supply lines, the number is small and economical. Furthermore, the components of the installation according to the present invention are uniform and easy to handle and simple in maintenance.

What is claimed is:

1. A power supply installation in a direct current railroad supplying a direct current power to an at least one first electric car power supply line, which comprises:
   (a) a power rectifier for converting an alternating current power to a direct current power in powering operation;

(b) a power inverter for converting a direct current power to an alternating current power in regenerative operation;

(c) a stopper diode connected between an output side of said power rectifier and an input side of said power inverter;

(d) a first pair of diodes each having a cathode connected to each other, said first pair of diodes being connected between the output side of said power rectifier and the at least one electric car power supply line;

(e) a second pair of diodes each having a anode connected to each other, said second pair of diodes being connected between the input side of said power inverter and the at least electric car power supply line; and (f) a breaker connected between a first common junction point of the cathodes of said first pair of diodes and a second common junction point of the anodes of said second pair of diodes, for simultaneously controlling a connection or a disconnection of a powering current supplied from said power rectifier to the electric car power supply line and a regenerative current supplied from the electric car power supply line to said power inverter.

2. The power supply installation in a direct current railroad as set forth in claim 1, wherein said breaker is a gate turn-off thyristor having an anode connected to the first common junction point and a cathode connected to the second common junction point.

3. The power supply installation in a direct current railroad as set forth in claim 1, which further comprises a second set of the first pair of diodes, a second set of the second pair of diodes and a second breaker connected between the output side of said power rectifier and the input side of said power inverter, and a second electric car power supply line arranged in parallel with the first electric car power supply line.

4. The power supply installation in a direct current railroad as set forth in claim 3, which further comprises a third set of the first pair of diodes, a third set of the second pair of diodes and a third breaker connected between the output side of said power rectifier and the input side of said power inverter, and a third electric car power supply line arranged in line with the first electric car power supply line with a first dead section intervening between the two power supply lines.

5. The power supply installation in a direct current railroad as set forth in claim 4, which further comprises a fourth set of the first pair of diodes, a fourth set of the second pair of diodes and a fourth breaker connected between the output side of said power rectifier and the input side of said power inverter, and a fourth electric car power supply line arranged in line with the second electric car power supply line with a second dead section intervening between the two power supply lines.

* * * * *